United States Patent
Walker

[15] 3,693,079
[45] Sept. 19, 1972

[54] APPARATUS FOR MEASURING PERCENT MOISTURE CONTENT OF PARTICULATE MATERIAL USING MICROWAVES AND PENETRATING RADIATION

[72] Inventor: Charles W. E. Walker, 855 McBride Blvd. Apt. 307, New Westminster, British Columbia, Canada

[22] Filed: April 14, 1970

[21] Appl. No.: 28,411

Related U.S. Application Data

[63] Continuation-in-part of Ser. No. 633,940, Aug. 26, 1967, Pat. No. 3,534,260.

[52] U.S. Cl. ..................324/58.5 A, 250/83.3 D
[51] Int. Cl. ............................................G01n 27/04
[58] Field of Search.................324/58.5; 250/83.3 D

[56] References Cited

UNITED STATES PATENTS 3,460,030   8/1969   Brunton et al............324/58.5

Primary Examiner—Edward E. Kubasiewicz
Attorney—Buckhorn, Blore, Klarquist and Sparkman

[57] ABSTRACT

Apparatus for measuring the percent moisture content of particulate materials, such as wood chips and grain, is described in which a beam of microwaves and a beam of penetrating radiation, such as gamma rays, X-rays, beta rays or high-velocity electrons, are transmitted through the same portion of a layer of such material. The beam of microwaves is directed at an acute angle to the particulate layer so that any microwave reflections do not strike the transmitting antenna and produce standing wave patterns. The microwaves are of a frequency that the microwave beam is partially absorbed by the water in the moist particulate material to produce a moisture signal, but has a wavelength greater than the dimensions of the particles to prevent diffraction effects. The beam of penetrating radiation is also partially absorbed by the total mass of the moist particulate material to produce a density signal. The moisture and density signals are then fed to an analog computer to determine the percent of moisture with an accuracy of within ±0.25 percent of the reading over a moisture range of about 25 to 65 percent, and within ±0.5 percent of the reading outside of this range and above 5 percent moisture.

20 Claims, 6 Drawing Figures

CHARLES W. E. WALKER
INVENTOR

BY
BUCKHORN, BLORE, KLARQUIST & SPARKMAN
ATTORNEYS

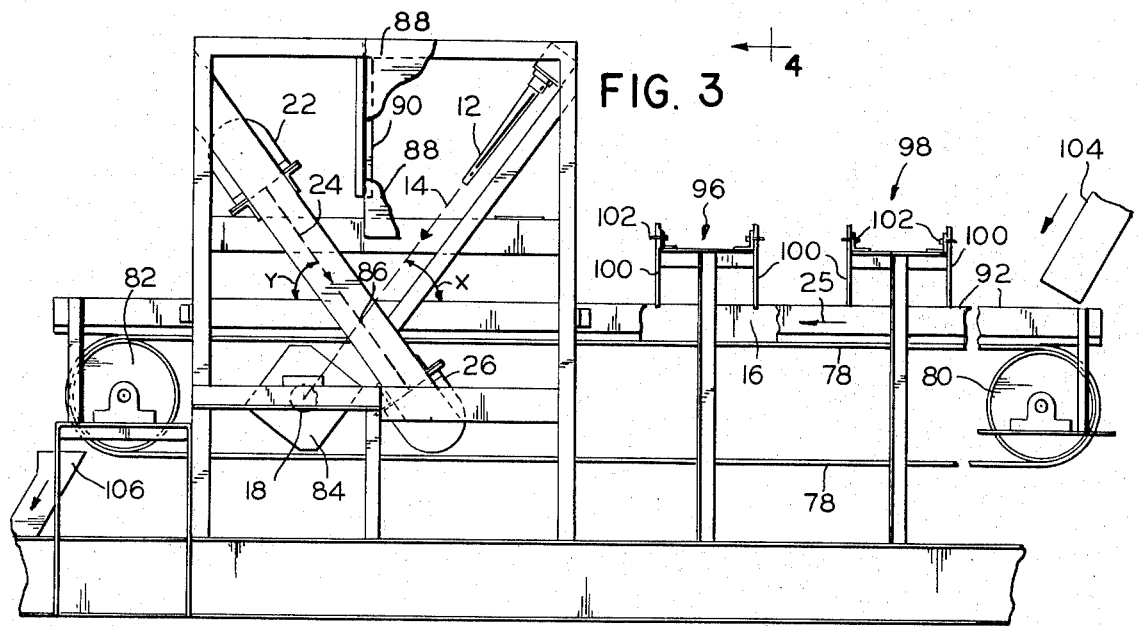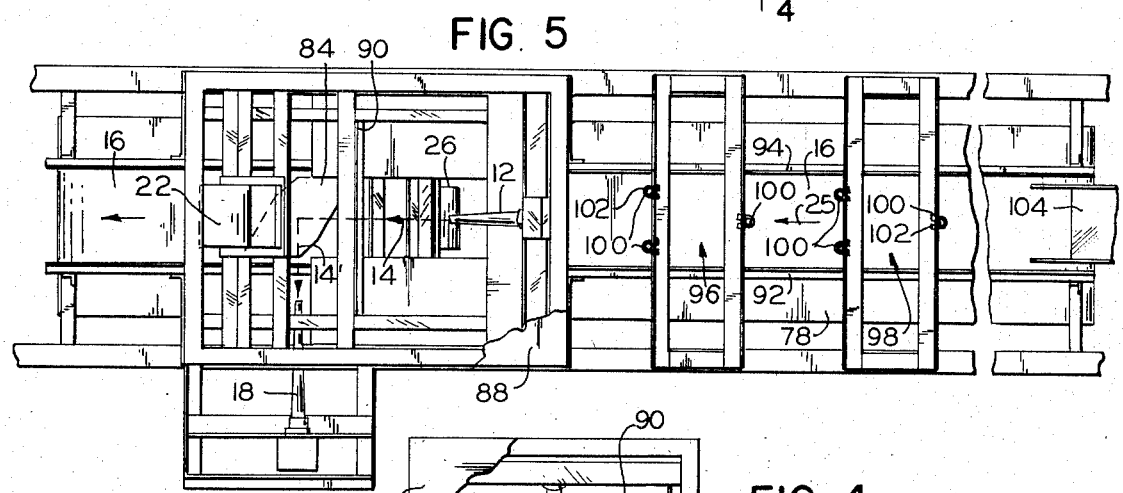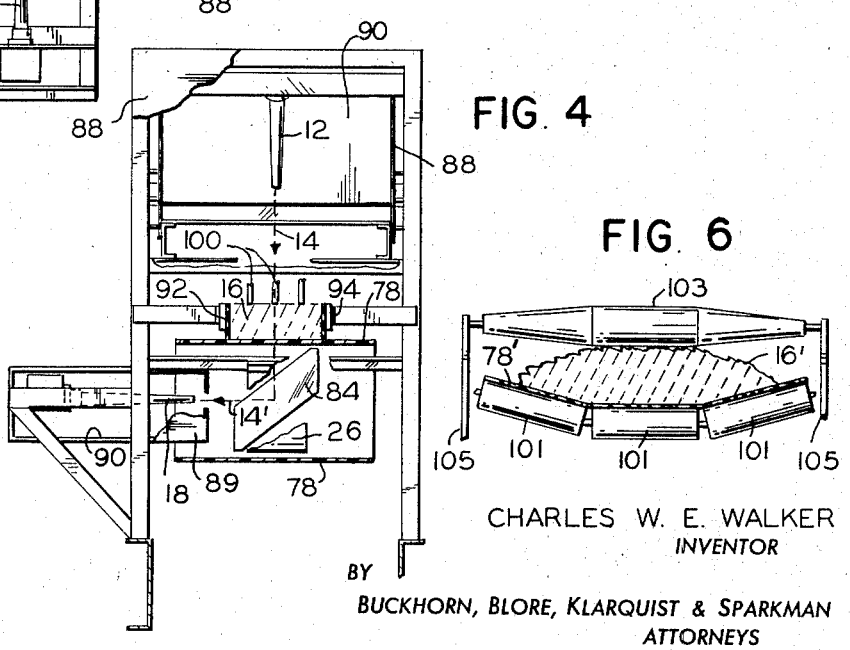
CHARLES W. E. WALKER
INVENTOR
BY
BUCKHORN, BLORE, KLARQUIST & SPARKMAN
ATTORNEYS

APPARATUS FOR MEASURING PERCENT MOISTURE CONTENT OF PARTICULATE MATERIAL USING MICROWAVES AND PENETRATING RADIATION

CROSS REFERENCE TO RELATED APPLICATION

The present application is a continuation-in-part of my earlier filed copending U.S. Pat. No. 3,534,260 filed Aug. 26, 1967, for METHOD AND APPARATUS FOR MEASURING MOISTURE CONTENT IN SHEET MATERIALS, by Charles W. E. Walker.

BACKGROUND OF THE INVENTION

The subject matter of the present invention relates generally to the measurement of percent moisture content of particulate materials, such as wood chips, grains and like materials, and in particular to an apparatus employing a beam of microwaves and a beam of penetrating radiation, such as gamma rays, X-rays, beta rays or high-velocity electrons, which are transmitted through the same portion of a layer of such particulate material. The microwave beam is absorbed partially by the water in the layer to produce a first signal $V_1$ directly related to the amount of moisture in such portion, while the beam of penetrating radiation is absorbed by the particulate material and water to produce a second signal $V_2$ proportional to the total density of the moist particulate material. These two signals are processed to produce a third signal $V_3$ proportional to the percentage of moisture content in such layer in accordance with the formula: $cV_3 = K_1 [(V_0 - V_1/_2] + K_2$,
where $K_1$ and $K_2$ are constants, as herein defined, and $V_0$ is the output signal of the microwave detector when no particulate material is present. As described in my above-mentioned copending U.S. Pat. No. 3,534,260, the beam of microwaves is directed at an acute angle with respect to the layer of particulate material so that any microwave reflections from such layer will not produce standing wave patterns which would otherwise cause interference distortion of the portion of such beam transmitted through such layer.

Previous attempts to measure the moisture of particulate material using microwaves and gamma rays using the apparatus shown in U.S. Pat. No. 3,460,030 to Brunton et al., issued Aug. 5, 1969, have not been successful. This is apparently at least in part due to the fact that in such prior apparatus the microwave beam is directed perpendicular to the stream of particulate material so that the microwave reflections produce standing wave patterns causing inaccuracies in the microwave moisture signal due to interference with the microwave beam. This problem is avoided in the apparatus of the present invention by directing the microwave beam at an acute angle of about 40° to 65° with respect to the layer of particulate material, as indicated above.

Another problem encountered when measuring the moisture content of a layer of large particles is caused by radiation diffraction effects which are produced when using microwaves having a frequency equal to the maximum absorption resonance frequency of water, approximately 22 gigahertz. At this frequency, the microwave beam has an extremely small wavelength which, in many cases, is less than the dimensions of the particles in the material being measured. As a result, part of the microwave radiation is diffracted by the particles, not absorbed thereby, causing inaccuracies in the moisture signal. In order to avoid these microwave diffraction effects, the wavelength of the microwave beam is increased to a value substantially greater than the dimensions of the particles. Of course, this means that the frequency of the microwave beam must be reduced below the water resonance frequency of 22 gigahertz. For example, when measuring the moisture content of wood chips 1 inch long, a microwave beam having a frequency of 2.45 gigahertz and a wavelength of 10 centimeters has been found to be satisfactory. Of course, for maximum absorption of the microwaves by the water molecule, it is desirable that the frequency of the microwaves be as close as possible to the water resonance frequency so that the final choice of frequency is necessarily a compromise.

In order to provide accurate measurements, the variations in thickness of the layer of particulate material must be minimized and such layer must be of sufficient thickness so that there is appreciable attenuation of the microwave beam by the moisture in such layer to enable the detection of small differences in moisture content. Thus, for the measurement of wood chips having a moisture content of 25 to 65 percent, the layer should be not less than 4 inches thick and should be maintained within ±½ inch of the average thickness.

Still another problem, which was not recognized in the previous apparatus, is the fact that the same time constant must be used in the output circuits of the microwave detector and the gamma ray detector. Otherwise, since the layer is moving, the computer will be processing a moisture signal produced by a microwave beam passing through different portions of the layer than is traversed by the gamma ray beam producing the density signal simultaneously applied to such computer. The affect of having different time constants can be demonstrated most simply and clearly by considering a step change in chip depth with no change in percent moisture. The microwave signal applied to the computer at time t will then be $V_1' + (V_1-V_1')e^{-t/T_1}$, where $V_1$ is the microwave signal before the step change, $V_1'$ is the ultimate value after the step change (for large $t$), and $T_1$ is the microwave circuit time constant. Similarly, the gamma gauge signal applied to the computer at time $t$ is $V_2' + (V_2-V_2')e^{-t/T_2}$, where $V_2$ is the gamma gauge signal before the step change, $V_2'$ is the ultimate value after the step change (for large $t$), and $T_2$ is the gamma gauge circuit time constant. Since the moisture percentage is unchanged, $V_1/V_2 = V_1'/V_2' = x$. However, the output signal from the computer at time $t$ is $$\frac{V_1' + (V_1-V_1')e^{-t/T_1}}{V_2' + (V_2-V_2')e^{-t/T_2}} = \frac{1+(V_1/V_1'-1)e^{-t/T_1}}{1+(V_2/V_2'-1)e^{-t/T_2}} \quad (X)$$

which is only equal to $x$ if $T_1 = T_2$.

It is therefore one object of the present invention to provide an improved apparatus for measuring the percent moisture content of particulate material with a high degree of accuracy.

A further object of the invention is to provide such an apparatus in which a layer of particulate material is measured by transmitting a beam of microwave radiation and a beam of a diverse penetrating radiation, as herein defined, through the same portion of such layer to produce a moisture signal and a density signal which are processed to produce a percent moisture signal.

Another object of the invention is to provide such an apparatus in which the microwave beam is directed at an acute angle to the layer to prevent the production of standing wave patterns, and the wavelength of the microwave beam is greater than the dimensions of the particles in such particulate material to avoid radiation diffraction effects.

An additional object of the present invention is to provide such an apparatus in which the output circuits of the microwave detector and the penetrating radiation detector have the same time constants in the two signal paths between the analog computer and such detectors, so that such computer processes a microwave moisture signal and a penetrating radiation density signal corresponding to the same portion of the layer of particulate material to produce the percent moisture signal.

Still another object of the present invention is to provide such an apparatus which is extremely compact in which the microwave antennas are in the form of solid dielectric rods provided on opposite sides of a conveyor belt transporting the layer of particulate material, and a microwave mirror is positioned beneath such conveyor belt to reflect the microwave beam to a receiving antenna positioned on the side of such conveyor.

A still further object of the present invention is to provide such an apparatus in which the layer of particulate material is maintained with a substantially uniform thickness by means of a leveling device positioned above the conveyor belt and guides provided along such belt.

BRIEF DESCRIPTION OF THE DRAWINGS

Other objects and advantages of the present invention will be apparent from the following detailed description of a preferred embodiment thereof and from the attached drawings of which:

FIG. 3 is a side elevation view of one embodiment of the moisture detection apparatus of the present invention with parts broken away for purposes of clarity;

FIG. 4 is a vertical section view taken along the line 4—4 of FIG. 3;

FIG. 5 is a plan view of the apparatus of FIG. 3 with parts broken away for clarity; and FIG. 6 is a partial vertical section view on an enlarged scale of another embodiment of the moisture detection apparatus of the present invention.

DESCRIPTION OF PREFERRED EMBODIMENTS

Figure 1:
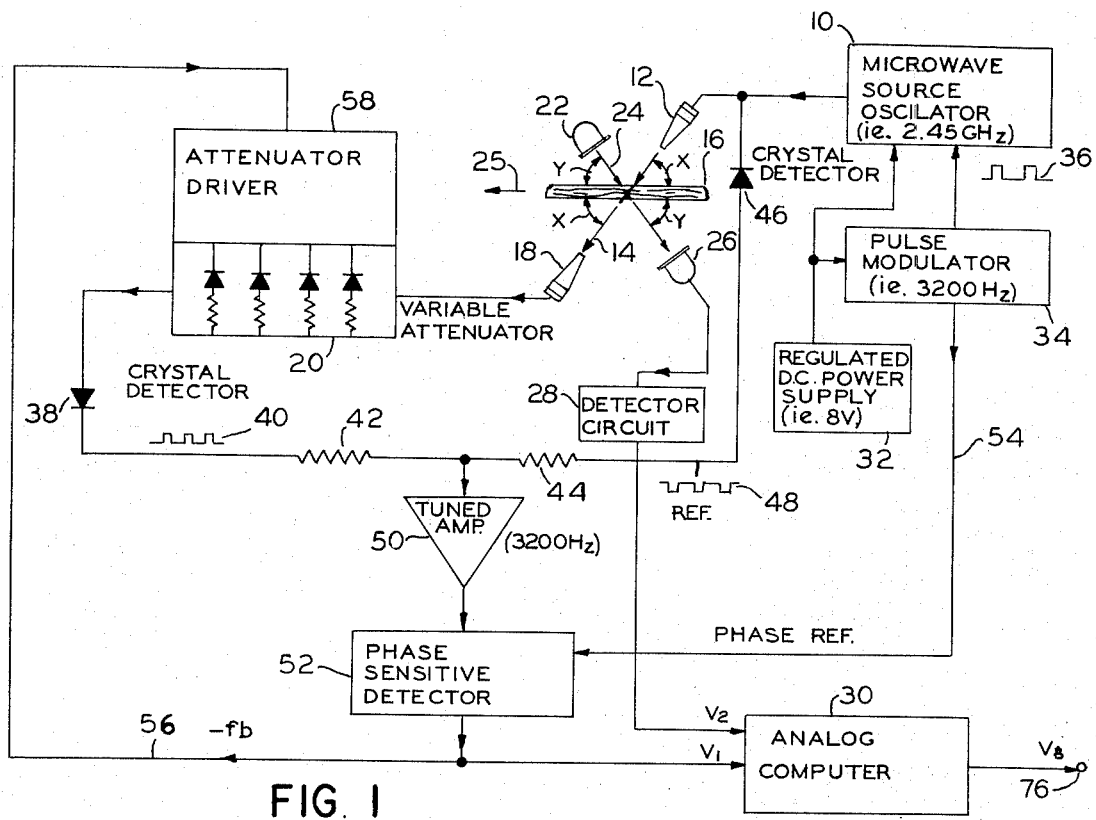
FIG. 1 is a schematic diagram showing the electrical circuit of one embodiment of the invention.

As shown in FIG. 1, one embodiment of the apparatus of the present invention includes a microwave signal source 10, containing an oscillator whose output is coupled to a microwave transmitting antenna 12. Antenna 12 emits a beam 14 of microwave radiation which is transmitted through a portion of a layer 16 of particulate material whose percent moisture content is sought to be measured. The frequency of the microwave beam is as close as possible to the 22 gigahertz microwave resonance frequency of water, subject to the requirement that the wavelength of the microwaves must be greater than the dimensions of the particles in layer 16 to minimize radiation diffraction effects, as discussed above. Therefore, when the particulate material in layer 16 is wood chips of about 1 inch size normally fed to a chemical digester in a paper mill, the wavelength of the microwave beam 14 is on the order of 10 to 12 centimeters and the frequency on the microwave source is therefore approximately 2.45 gigahertz. After a portion of the beam 14 is absorbed by the moisture in layer 16, the microwave beam strikes a microwave receiving antenna 18 and the portion of the beam received by the antenna has a power level which varies according to the amount absorbed. The microwave signal output of such antenna is transmitted to the input of a variable microwave attenuator 20, which may be of the PIN diode type discussed in my copending U.S. patent application, Ser. No. 633,940.

A source 22 of penetrating radiation, diverse from the microwaves, which may be electromagnetic radiation having a wavelength less than about 100 angstroms, such as X-rays or gamma rays or, in some cases, beta rays or high-velocity electrons, is positioned adjacent the layer 16 of particulate material so that a beam 24 of such penetrating radiation passes through the same portion of the layer that is traversed by the microwave beam 14. Thus, the central axis of the microwave beam 14 and the penetrating radiation beam 24 intersect within the layer 16. The layer 16 may be stationary but is preferably a moving layer carried by means of a conveyor belt in the direction indicated by arrow 25. One suitable source 22 of penetrating radiation 24 is a radiation source of gamma rays emitted from a radioactive material, such as cesium 137 which has a half life of about 33 years. This radioactive source is suitably shielded and collimated to provide a narrow beam of gamma rays 24 which, after being partially absorbed by the water and particulate material in layer 16, is transmitted to a suitable detector 26, such as an ionization gauge. The detector 26 converts the gamma radiation into an electrical signal that is fed to a detector circuit 28 to produce an output signal $V_2$ which is very nearly proportional to the total density of the water and particulate material in the portion of layer 16 through which beam 24 travels. The radioactive source 22, gamma ray detector 26 and detector circuit 28 are of a conventional type and may be obtained as a density gauge unit from Ohmart Corporation of Cincinnatti, Ohio. Density signal $V_2$ is applied to one input of a suitable signal processing means, such as an analog computer 30. The density gauge unit is conventional and, therefore, will not be described further except to note that it may contain a reference source of gamma rays and associated detector to produce a reference signal which is compared with the output signal of detector 26 in a differential amplifier or other comparator in order to compensate for the reduction in energy of the gamma ray beam due to the aging of radioactive source 22.

It will be understood that the output signal $V_2$ is related to the total density $y$ by a relation of the general form $V_2 = a + by + cy^2 + \cdots$ in which the constants $a$ and $b$ are commonly referred to as "zero suppression" and "calibration slope" respectively. The higher order terms represent nonlinearity and are small enough that, over a sufficient operating range, they may be neglected and a simple linear relationship used between $V_2$ and total density $y$. In the absence of a balancing or reference source and detector, both the constants $a$ and $b$ change as the source decays so that both "suppression" and "calibration" controls must be adjusted at regular intervals, their frequency depending on the measurement accuracy which it is desired to maintain. With a balancing source of the same kind as the measuring source and with associated detector, adjustment of the "suppression" control is obviated and the frequency with which the "calibration" control must be adjusted to maintain a given measurement accuracy is greatly reduced.

As shown in FIG. 1, the microwave signal oscillator 10 which may be a triode vacuum tube is connected to a regulated D.C. power supply 32 which supplies a constant D.C. voltage of 8 volts to such oscillator. A pulse modulator circuit 34 is also connected to power supply 32 and applies rectangular pulses 36 of a frequency of about 3,200 hertz and 300 volts amplitude to the microwave source to amplitude modulate the microwave signal with such pulses. Alternately, the oscillator 10 may be a solid state microwave source requiring only a single pulsed voltage power supply of about 24 to 40 volts to provide an amplitude modulated microwave signal. It should be noted that the microwave beam is not frequency modulated so that standing wave patterns can be produced due to reflections between layer 16 and antenna 12. However, this is prevented by directing the microwave beam through the layer 16 at an acute angle X, as hereafter described.

The microwave attenuator 20, with its driver 58, is operated in a negative feedback loop arrangement in such a way that the microwave output signal from the attenuator 20 tends to be maintained constant, irrespective of the microwave signal level fed to the attenuator input. In fact, the attenuator 20 is so driven by its driver 58 that the amount by which it attenuates or absorbs the microwave signal is the exact inverse of the attenuation or absorption occurring in the layer 16 and, thus, provides a measure of that absorption.

The driver 58 is actuated by a signal $V_1$ supplied to it via the feedback connection 56 and is so constructed that the attenuation of the microwave signal produced in attenuator 20 is directly proportional to this signal $V_1$. Thus, this signal $V_1$ is an inverse measure of the absorption occurring in layer 16 and is applied also as another input to analog computer 30. If the value of this signal in the absence of absorbing layer 16 is $V_0$ and its value in the presence of layer 16 is $V_1$, then $V_0 - V_1$ is directly proportional to the absorption occurring in layer 16.

The signal $V_1$, to actuate the driver 58 so as to keep the output of attenuator 20 constant, is obtained in the following manner, which is in conformity with normal negative feedback control practice. The microwave output signal from attenuator 20 is transmitted to crystal detector 38 which rectifies the microwave signal to produce a pulsed signal 40 of 3,200 hertz and voltage amplitude $v_s$. This is compared to a constant reference signal 48 of voltage amplitude $v_r$ which may be obtained from a constant reference source, such as the pulse modulator 34 or, as shown in FIG. 1, may be obtained from a second crystal detector 46 supplied with a pulsed microwave signal directly from the microwave source 10. The two detectors 38 and 46 are connected in opposite polarity so that the two signals 40 and 48 are of opposite sign. These are connected across the two resistors 42 and 44 in series which, with the input connection to amplifier 50 from their common point, form a comparator circuit. If resistors 42 and 44 have resistance values $R_1$ and $R_2$, respectively, the resulting voltage amplitude of the signal at their common point is $(v_s R_2 - v_r R_1)/(R_1 + R_2) = \Delta v$, which is therefore the input signal to amplifier 50. This amplifier has very high grain and is desirably a narrow band tuned amplifier, tuned to the 3,200 hertz signal to reduce noise in its output which is, therefore, a nearly pure 3,200 hertz sine wave. This output signal from amplifier 50 is connected to the phase sensitive detector 52 to produce the required D.C. signal $V_1$. Since the overall gain G of amplifier 50 and phase sensitive detector 52 is very large, only a very small input voltage $\Delta v$ is required to produce $V_1$: $\Delta v = V_1/G$. Thus, we see that the voltage amplitude $v_s$, which is the amplitude of the detected output signal from attenuator 20, is very nearly equal to $v_r R_1/R_2$ which is constant: in fact, $v_s$ departs from this constant quantity only by an amount $\Delta v[R_1 + R_2/R_2]$, which can be made as small as we please by choosing G large enough.

The phase sensitive detector 52 has a phase reference input connection 54 from the pulse modulator 34 so that the polarity of the rectified output signal $V_1$ is dependent on whether $V_s$ is greater than or less than $v_r [R_1/R_2]$, which is a required condition for correct operation of the negative feedback loop, as is well understood.

If attenuator 20 is a rotary vane, cut off or other mechanically operated attenuator, its driver 58 would be an electric motor and associated power amplifier. If, however, attenuator 20 is of the PIN diode type, such as the Model 8730 series supplied by Hewlett-Packard Company of Palo Alto, California, in which the microwave attenuation varies in accordance with direct bias current supplied to PIN diodes connected as variable resistors between the conductors of the high frequency transmission line or across the waveguide in such attenuator, then the driver 58 will contain a function generator which will supply the required bias current in accordance with the feedback voltage $V_1$. One suitable device, which can be employed for both the driver 58 and PIN diode attenuator 20, is manufactured as a single unit by Alpha Industries, Inc. of Newton Upper Falls, Massachusetts.

As shown in FIG. 1, the microwave beam 14 is directed at an acute angle X to the plane of the layer 16 of particulate material. This angle X is in the range of about 40° to 65°, and is preferably between 50° and 56°, to prevent the microwave reflections off layer 16 from striking the transmitting antenna 12 and producing microwave standing wave patterns. If such microwave standing wave patterns are produced, such as when the microwave beam is directed at the layer 16 at approximately right angles to the layer, in the manner shown in U.S. Pat. No. 3,460,030 mentioned previously, the intensity of the microwave beam which is received at antenna 18 becomes critically dependent on a number of factors in addition to the moisture content of the layer, such as the depth and total density of the layer, its exact location relative to the antennas, the frequency of the microwaves and the size and distribution of the chips. These factors affect the amplitude of the standing wave pattern or its configuration relative to the moisture in the chips or to the antennas. Inaccuracy in the moisture determination then results because these factors cannot all be precisely constant. This problem is avoided by the present invention, as indicated above, due to the acute angle X of the microwave beam 14, as disclosed in my copending U.S. Patent application, Ser. No. 633,940.

Figure 2:
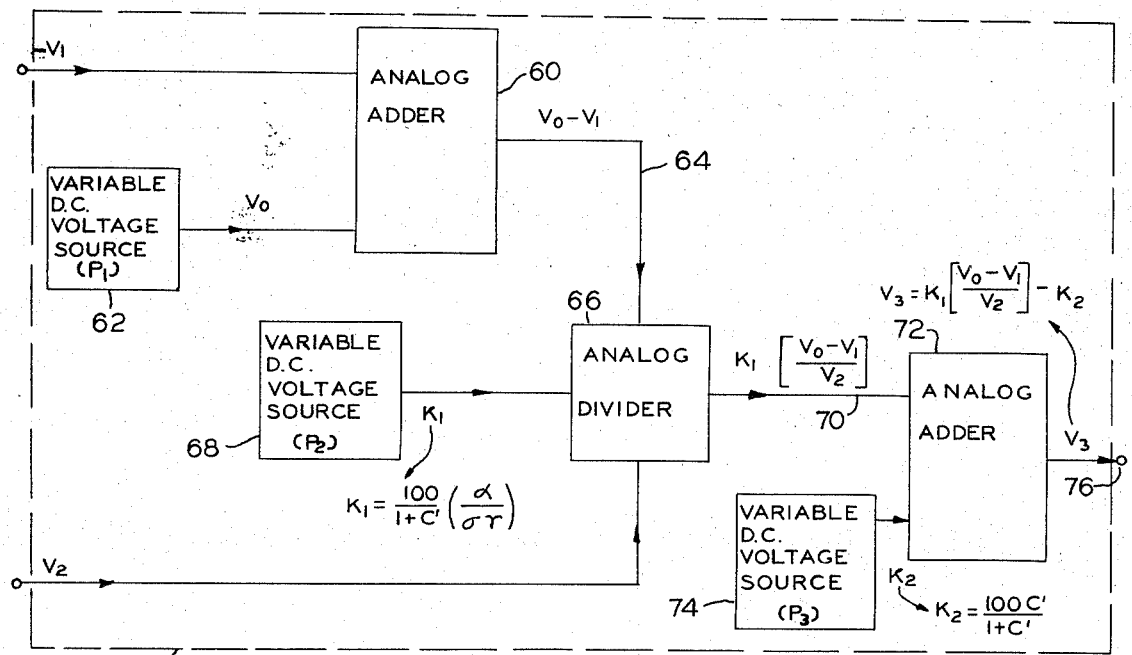
FIG. 2 is a schematic diagram showing one type of analog computer suitable for use in the circuit of FIG. 1.

The signal processing means 30 may be an analog computer, such as is illustrated in block diagrammatic form in FIG. 2, and includes an analog adder circuit 60 having one input connected to the output of the phase sensitive detector 52 of FIG. 1 so that the moisture signal $V_1$ is applied thereto. The other input of the analog adder 60 is connected to the output of a first available D.C. voltage source 62 including a potentiometer $P_1$ which applies a D.C. voltage $V_0$ to such other input. The constant D.C. voltage $V_0$ is equal to the voltage output of the phase sensitive detector 52 when no particulate material 16 is in the path of the microwave beam 14. The output signal of the analog adder circuit 60 is proportional to $V_0 - V_1$ and is transmitted through output conductor 64 to one input of an analog divider circuit 66. A second input of the analog divider 66 is connected to the output of the detector circuit 28 of FIG. 1 so that the density signal $V_2$ is applied thereto. A third input of the analog divider 66 is connected to a second variable D.C. voltage source 68 including a potentiometer $P_2$ which applies a constant D.C. voltage $K_1$ thereto. The output signal of the analog divider circuit 66 is proportional to $K_1 [V_0 - V_1/V_2]$. The voltage constant $K_1$ is equal to $$\left(\frac{100}{1+C'}\right)\left(\frac{\alpha}{\sigma \nu}\right),$$

and $C'$ equals $$\frac{W_c}{f} - \frac{\rho}{\sigma}\left(1 + \frac{W_c}{f}\right),$$

where:
- $W_c$ — the mass of water chemically combined by a hydrogen bond with the cellulose of the wood chips;
- $f$ — the mass of dry wood chips;
- $\rho$ — the microwave absorption sensitivity in dry wood and combined water;
- $\alpha$ — the gamma gauge sensitivity or slope of calibration curve;
- $\sigma$ — the microwave absorption sensitivity in uncombined water; and
- $\nu$ — the microwave meter sensitivity or slope of calibration curve.

The output signal $K_1 [V_0 - V_1/V_2]$ of the analog divider circuit 66 is transmitted through an output connection 70 to one input of a second analog adder 72. The output input of the analog adder 72 is connected to a third variable D.C. voltage source 74 including a potentiometer $P_3$ which applies another constant voltage $K_2$ thereto. Voltage constant $K_2$ equals $100(C')/(1 + C')$, where $C'$ is defined for first constant $K_1$. The analog adder 72 produces at its output a percent moisture signal $V_3$, given by the formula $V_3 = K_1 [(V_0 - V_1)/V_2] + K_2$. This moisture signal $V_3$ is transmitted to the output terminal 76 of the analog computer and is proportional to the percent moisture content in the measured portion of the particulate material of layer 16.

It should be noted that the output circuits of the radiation detectors 18 and 26 must have the same time constants for the reasons discussed previously. This time constant is preferably between 0.1 and 0.5 second to reduce the noise in the density signal when a radioactive source is used to produce the beam of penetrating radiation.

As shown in FIGS. 3, 4, and 5, one embodiment of the moisture measurement apparatus of the present invention includes a conveyor belt 78 which carries the layer 16 of particulate material thereon moving in the direction of arrow 25. As a result, successive portions of such layer are moved into a test position where the microwave beam 14 and the beam 24 of penetrating radiation intersect and pass through such layer portion. The conveyor belt 78 passes around two rollers 80 and 82 at the opposite ends thereof, one of which is motor driven to provide a belt speed of, for example, about 200 feet per minute. As shown in FIG. 3, the transmitting antenna 12 of the microwave source is positioned above the upper reach of the conveyor belt 78 while the receiving antenna 18 is positioned below such upper reach. By using a microwave mirror 84 below the conveyor belt, the receiving antenna may be positioned to the side of the belt so that the bulky detecting equipment need not be located between the upper and lower reaches of the belt. Thus, the microwave mirror 84 is positioned in the path of the microwaves extending from the bottom of the layer 16 to the RECEIVING ANTENNA 18. As a result, the microwave beam 14 travels from the transmitting antenna 12 through layer 16 to thmirror 84 where it is reflected along path 14' to the receiving antenna 18. The microwave mirror 84 also has a collimating affect on the microwave beam.

The microwave antennas 12 and 18 are preferably in the form of solid dielectric rods of polystyrene, aluminum oxide or other suitable high dielectric material. Such dielectric rod antennas have the advantage that they can be proportioned to provide a more uniform strength microwave field over a larger area at a relatively short distance from the antenna. While not shown, the antennas 12 and 18 may be surrounded by a low density polystyrene foam plastic with a moisture impermeable outer covering to prevent moisture from depositing on the sides of the antenna rods. In addition, heaters may be positioned beneath the antenna rods to prevent moisture from condensing on such rods, care being taken to avoid distortion of the microwave beam by such heaters.

The source 22 of gamma rays or other penetrating radiation is positioned above the conveyor belt 78 while the detector 26 of such radiation is positioned beneath the upper reach of such belt. The beam 24 of penetrating radiation intersects the microwave beam 14 within the layer 16 of particulate material. The intersecting point 86 of the axis of such two beams may be located midway through the layer 16 of particulate material. The microwave beam 14 is directed at an angle X to the plane of layer 16 which is in the range of about 50° to 56° to prevent standing wave patterns as discussed above. The beam 24 of penetrating radiation is directed at the layer 16 at an angle Y which is preferably equal to angle X so that such beam has approximately the same absorption path length through the particulate material as the microwave beam 14.

The microwave transmitting and receiving antennas 12 and 18 are each mounted on support members within two separate metal housings 88 and 89 whose sides have been broken away in FIGS. 3, 4, and 5 for purposes of clarity. The inner surface of each housing is coated with a microwave absorber material 90, such as polystyrene plastic foam containing graphite or other-conductive material, to prevent microwave reflections therefrom. Each housing is provided with a window opening in alignment with the end of the antenna in such housing to allow the microwave beam to pass unimpeded through the housing wall.

In order to provide the particulate layer 16 with a substantially uniform depth, a pair of horizontal guide members 92 and 94 may be provided adjacent the upper surface of the conveyor belt 78 and are spaced apart by a distance corresponding to the width of the particulate layer 16, as shown in FIGS. 4 and 5. These guide members 92 and 94 confine the outer edges of the particulate layer and provide such layer with a substantially rectangular cross-sectional shape. In addition, a pair of leveling rake means 96 and 98 are provided adjacent the top of the conveyor belt in front of the housing 88. Each of the leveling rake means includes three rods 100 which are adjustable vertically and held in a spaced position above the conveyor by U-bolt clamps 102. One of the rods 100 is positioned in front of and between the other two rods so that each of the three rods engages a different portion of the particulate layer 16. Thus, the layer is smoothed into a substantially uniform thickness by the rakes before it passes into the housing 88 and through the beam intersection point 86. As a result of use of the leveling rakes 96 and 98 and the guide members 92 and 94, the particulate layer 16 is provided with a uniform thickness within + 0.5 inch and a constant width so that substantially the same volume of particulate material is sensed by the microwave beam and the penetrating radiation beam at all times.

As shown in FIG. 5, the guide members 92 and 94 can be eliminated and upper reach of the conveyor belt 78' curved upward at its sides by means of guide rollers 101. Furthermore, the leveling rakes 96 and 98 may be replaced by leveling rollers 103 which have a central portion of larger diameter than its end portions. The leveling rollers are rotatably mounted on one end of support arms 105 which are pivoted at their other ends to allow the vertical position of the roller to be automatically adjusted according to the thickness of the particulate layer 16'. The pressure exerted on the layer 16' by the roller 103 may be adjusted with suitable counterbalancing weights or springs attached to the support arms 105.

When the particulate material in layer 16 is made of wood chips, layer 16 should be at least 4 inches thick to provide sufficient attenuation of the microwave beam to enable detection of small changes in moisture content. In addition, the microwave beam 14 should have a frequency in the range of 1 to 5 gigahertz and is preferably about 2.45 gigahertz with a wavelength of 10 to 12 centimeters so that it is much larger than the 1 inch maximum dimension of the wood chips. Of course, the microwave frequency and wavelength vary for different types of particulate material. For example, in the case of grain typically having a range of 5 to 25 percent moisture, the microwaves may be of a higher frequency, in the range of 5 to 30 gigahertz, with a preferable frequency of about 10 gigahertz and a wavelength of only 3 centimeters since the maximum dimension of such grain is less than 1 centimeter.

The particulate material in layer 16 is placed on one end of the conveyor 78 in any conventional manner, such as by feeding it through a trough 104, and is removed from the output end of such conveyor by another trough 106 after the moisture measurement has taken place.

The moisture measurement apparatus of the present invention may be used for measuring the moisture of any type of particulate material having a high moisture content. The type of penetrating radiation employed for beam 24 varies depending upon the type of particulate material in layer 16, but in general is any electromagnetic radiation having wavelength less than about 100 angstroms, which includes gamma rays and X-rays and, in some cases, may be beta rays or high velocity electrons. Of course, beta rays and high velocity electrons can only be employed for extremely thin layers of low density particulate material.

It will be obvious to those having ordinary skill in the art that many changes may be made in the above-described preferred embodiment of the present invention without departing from the spirit of the invention. Therefore, the scope of the present invention should only be determined by the following claims.

I claim:

1. Apparatus for measuring the moisture content of particulate material, comprising:

supply means for supplying a layer of moist particulate material;

first radiation means including a first source means for directing a beam of microwaves free of frequency modulation through at least a portion of said layer, said microwaves having a frequency which is absorbed a greater amount by the water in said layer than by the solid particulate material and having a wavelength which is greater than the dimensions of the particles in said particulate material, and a first detector means for detecting the transmitted portion of said microwave beam to obtain a first electrical signal which is proportional to the amount of water in said layer portion;

second radiation means including a second source means for directing a beam penetrating radiation through substantially the same portion of said layer, said penetrating radiation being of a type which is diverse from said microwaves and is absorbed in an amount proportional to the total mass of the moist particulate material, and a second detector means for detecting the transmitted portion of said beam of penetrating radiation to obtain a second electrical signal proportional to the total mass of the moist particulate material in said layer portion; signal processing means for combining the first signal and the second signal to produce a third electrical signal proportional to the percent of water in said layer portion; and support means for supporting said first radiation means so that the beam of microwaves is directed through the particulate layer at an acute angle which is sufficiently small to prevent the microwaves reflected by said layer from producing standing wave interference patterns with said microwave beam.

2. Apparatus in accordance with claim 1 in which the penetrating radiation is electromagnetic radiation having a wavelength less than 100 angstroms.

3. Apparatus in accordance with claim 1 in which the particulate material is wood chips, the penetrating radiation is gamma rays and the microwaves have a frequency in the range of 1 to 5 gigahertz.

4. Apparatus in accordance with claim 3 in which the wood chips are provided in a layer of substantially uniform thickness, at least 10 centimeters thick, and the microwaves have a frequency of about 2.45 gigahertz and a wavelength of about 12 centimeters.

5. Apparatus in accordance with claim 1 in which the acute angle is in the range of about 40° to 65°.

6. Apparatus in accordance with claim 3 in which said angle is about 53°.

7. Apparatus in accordance with claim 1 in which the supply means includes a conveyor belt with the first source means positioned above and the first detector means positioned below said conveyor belt and the first radiation means includes a microwave reflector member beneath said conveyor belt to change the direction of the microwave beam in the path between the layer and the first detector means so that said first detector means is positioned to the side of said conveyor belt.

8. Apparatus in accordance with claim 7 in which the beam of penetrating radiation intersects the microwave beam in said portion of the particulate layer.

9. Apparatus in accordance with claim 1 in which the particulate material is grain, the penetrating radiation is gamma rays and the microwaves have a frequency in the range of 5 to 30 gigahertz.

10. Apparatus in accordance with claim 9 in which the microwaves have a frequency of about 10 gigahertz and a wavelength of about 3 centimeters.

11. Apparatus in accordance with claim 1 in which the supply means includes a conveyor which provides a moving layer of particulate material.

12. Apparatus in accordance with claim 11 in which the supply means includes a leveling means for leveling the layer of particulate material to provide it with a substantially uniform thickness at the measurement position.

13. Apparatus in accordance with claim 12 in which the leveling means includes at least one rake means supported above the conveyor and having a plurality of projections which extend down into said layer.

14. Apparatus in accordance with claim 12 in which the leveling means includes at least one roller means having a central portion of larger diameter than its end portions.

15. Apparatus in accordance with claim 1 in which the particulate material has a moisture content of at least 25 percent.

16. Apparatus in accordance with claim 1 in which the signal processing means is an analog computer in which the first signal $V_1$ is divided by the second signal $V_2$ to produce the third signal $V_3$, in accordance with the formula $V_3 = K_1 [(V_0 - V_1)/V_2] + K_2$, where $V_0$ is the output signal of the first detector means when no particulate material is present, and where $K_1$ and $K_2$ are constants, as herein defined.

17. Apparatus in accordance with claim 1 in which the layer of particulate material is moving during the moisture and mass measurements, and the first detector means and the second detector means are electrical circuits each having the same response time constant.

18. Apparatus in accordance with claim 17 in which the time constant is about 0.1 to 0.5 second.

19. Apparatus in accordance with claim 1 in which the first detector means includes a microwave attenuator means and an electrical control means connected to form a negative feedback circuit between the output of said attenuator and its control input for electrically varying the microwave attenuation of said attenuator means.

20. Apparatus in accordance with claim 19 in which the macrowave attenuator means includes PIN diodes and the control means includes an attenuator driver means connected in the negative feedback circuit to said PIN diodes for providing said attenuator means with a microwave output signal of substantially constant amplitude related to the amplitude of a reference microwave signal applied to one input of a comparator means having its other input connected to the output of said attenuator means and having its output connected to said attenuator driver means.

* * * * *

PO-1050
(5/69)

UNITED STATES PATENT OFFICE
CERTIFICATE OF CORRECTION

Patent No. __3,693,079__      Dated __September 19, 1972__

Inventor(s) __Charles W.E. Walker__

It is certified that error appears in the above-identified patent and that said Letters Patent are hereby corrected as shown below:

Column 1, line 32, "$cV_3 = K_1 [(V_0 - V_1/2] + K_2$" should be --$V_3 = K_1 [\frac{V_0-V_1}{V_2}] + K_2$--.

Column 6, line 13, "$(v_sR_2-v_rR_1)/(R_1+R_2) = \Delta v$" should be --$\frac{v_sR_2 - v_rR_1}{R_1 + R_2} = \Delta v$--

Column 6, line 16, "grain" should be --gain--;

Column 6, line 34, "$V_S$" should be --$v_s$--;

Column 7, line 23, "available" should be --variable--;

Column 7, line 67, "output" should be --other--;

Column 7, line 70, "$100(C')/(1 + C')$" should be --$\frac{100 (C')}{1 + C'}$--;

Column 8, lines 3 and 4, "$[(V_0 - V_1)/2]$" should be --$[\frac{V_0-V_1}{V_2}]$--;

Column 8, lines 39 and 40 "RECEIVING ANTENNA" should be --receiving antenna--;

Column 8, line 42, "thmirror" should be --the mirror--;

Column 9, line 13, delete the hyphen after "other";

Column 12, line 19, "$[(V_0-V_1)/V_2]$" should be --$[\frac{V_0-V_1}{V_2}]$--;

Column 12, line 38, "macrowave" should be --microwave--.

Signed and sealed this 13th day of February 1973.

(SEAL)
Attest:

EDWARD M. FLETCHER, JR.
Attesting Officer

ROBERT GOTTSCHALK
Commissioner of Patents